No. 895,161. PATENTED AUG. 4, 1908.
J. A. CHILDRESS.
VEGETABLE AND FRUIT SLICER AND CUTTER.
APPLICATION FILED OCT. 13, 1906.

Witnesses
Howard D. Orr
J. F. Riley

Joseph A. Childress, Inventor,
By
Attorney

UNITED STATES PATENT OFFICE.

JOSEPH A. CHILDRESS, OF PILOT, VIRGINIA.

VEGETABLE AND FRUIT SLICER AND CUTTER.

No. 895,161.　　　Specification of Letters Patent.　　　Patented Aug. 4, 1908.

Application filed October 13, 1906. Serial No. 338,796.

*To all whom it may concern:*

Be it known that I, JOSEPH A. CHILDRESS, a citizen of the United States, residing at Pilot, in the county of Montgomery and State of Virginia, have invented a new and useful Vegetable and Fruit Slicer and Cutter, of which the following is a specification.

The invention relates to vegetable and fruit slicers and cutters.

The object of the present invention is to improve the construction of vegetable and fruit slicers and cutters, and to provide a simple, inexpensive and efficient slicer and cutter adapted to enable vegetables and fruit to be cut and sliced in a variety of ways, and capable of ready adjustment to cut the slice or piece either thick or thin.

A further object of the invention is to provide a device of this character having a reversible cutter, provided with a pair of different blades adapted to be instantly brought into position for use, so that the fruit and vegetables may be cut and sliced in several ways, without changing the cutter.

It is also the object of the invention to enable the cutter to be removed either for changing the same or for sharpening the blades thereof.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

Figure 1:
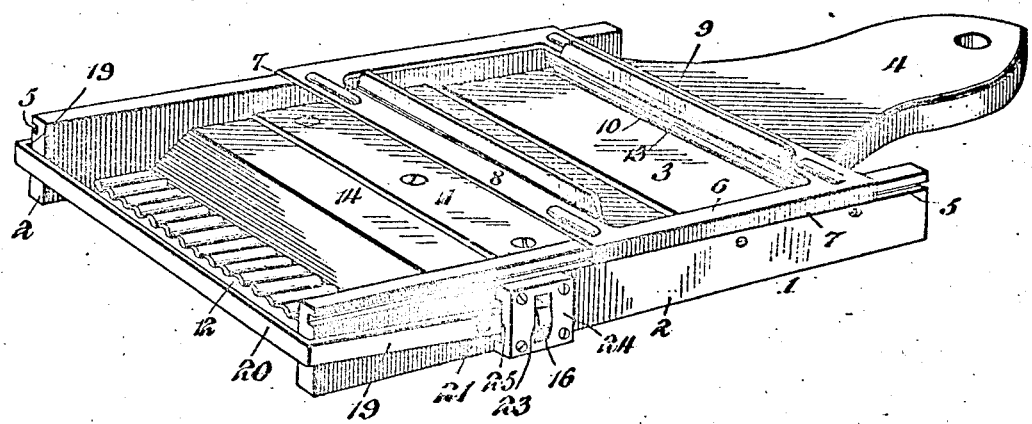
Figure 2:
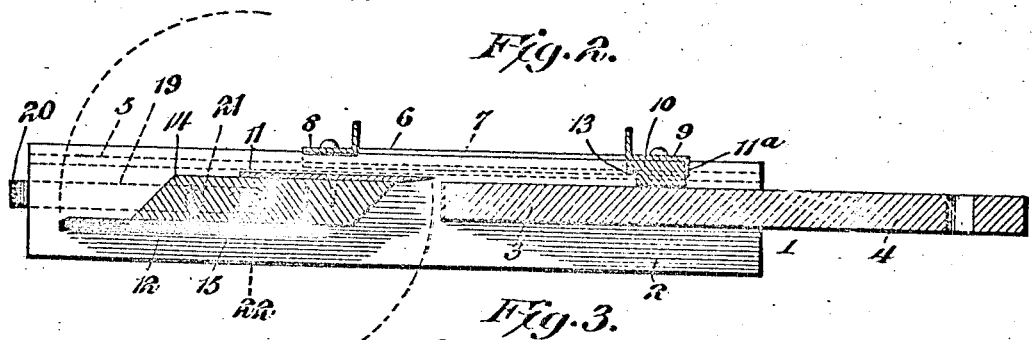
Figure 3:
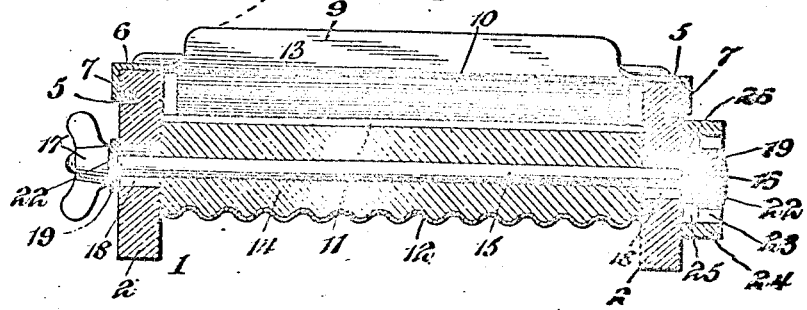

In the drawing:—Figure 1 is a perspective view of a fruit and vegetable slicer and cutter, constructed in accordance with this invention. Fig. 2 is a longitudinal sectional view of the same. Fig. 3 is a transverse sectional view.

Like numerals of reference designate corresponding parts in all the figures of the drawing.

1 designates a frame or support, composed of parallel sides 2 and a connecting piece 3, extending across the space between the sides of the frame and projecting beyond the said side pieces at one end of the device, and shaped into a handle 4. The side pieces are provided at their outer faces with longitudinal grooves 5, forming ways for a reciprocatable slide 6, which is adapted to carry the material to be sliced or cut to and from a cutter, is provided at opposite sides with substantially L-shaped flanges 7, which embrace the sides of the frame or support and extend into the grooves 5 thereof, as clearly illustrated in Fig. 3 of the drawing.

The slide, which is substantially rectangular and which may be slidably mounted on the frame or support in any other preferred manner, is provided at the ends of the sides with transverse connecting portions 8 and 9, having projecting transverse flanges for engaging the material. The inner or lower transverse portion 8 is spaced from the cutter, and the connecting portion 3 of the frame or support, and the upper or outer transverse portion 9 is provided with a strip or cleat 10, which has its face arranged close to the contiguous face of the connecting portion 3, and which is adapted to force the material against the blades 11 and 12 of the knife or cutter. The transverse portion 9 is also provided with an inwardly extending flange 11$^a$, which fits against the back or outer transverse edge of the cleat 10. The inner edge, which is presented to the knife, is preferably provided with a recess 13 to enable the upper or outer portion of the cleat to extend over the cutting edge of the blade, and also to present a square edge to the same completing the slice to insure a clean, smooth cut. The knife or cutter consists of the said blades, and a block or stock 14 having beveled end edges, and pivoted by a transverse rod or bolt 15 between the sides 2, which extend beyond the inner transverse edge of the connecting portion 3 of the frame or support a sufficient distance to accommodate the knife or cutter. The blades are secured to the opposite faces of the block or stock and extend in opposite directions from the ends thereof. The blade 11 is flat and is provided with a straight cutting edge, and the other blade 12 is corrugated to provide a fluted cutting edge, and by rotating the cutter or knife on its pivot, either of the blades may be brought into position for operation. The knife or cutter is detachable by removing the pivot bolt or rod, and in practice the device will be provided with a plurality of knives or cutters having a variety of blades, so that the material may be cut or sliced in a variety of ways or shapes. Also the knife and cutter may be detached for sharpening the blades, but the latter may be sharpened by a file without removing them from the frame or support.

The pivot rod or bolt, which is provided at one end with a head 16, and which has a thumb nut 17 at the other end, is arranged in slots 18 of the sides 2 of the frame or support. The slots 18 are arranged vertically, when the device is in a horizontal position, and they enable the knife or cutter to be raised or lowered to vary the thickness of the slices or pieces. This adjustment is effected by means of a lever, consisting of a substantially U-shaped member, composed of parallel sides 19 and a connecting transverse portion 20, which extends across the lower end of the device, when the same is arranged in a vertical position. The sides of the lever are pivoted at an intermediate point to the outer faces of the sides 2 of the frame or support by means of screws 21, or other suitable fastening devices, and the inner arms of the sides are provided with perforations 22 for the reception of the pivot rod or bolt. The pivot rod or bolt is adapted to be tightened to clamp the knife or cutter in its adjusted position, and the said knife or cutter is adjusted by swinging the lever, the transverse portion 20 forming a handle for this purpose.

In order to enable the knife or cutter to be moved vertically, and to counteract any tendency of the same to roll or rotate on the pivot when it is adjusted, the head 16 of the rod or bolt is made oblong and is provided with flat side faces, and is arranged in a slot 23 of a guide 24. The slot 23, which is arranged vertically when the device is in a horizontal position, is disposed in alinement with the slots 18 of the sides of the frame, and it prevents any rotary movement of the pivot bolt or rod. As the pivot bolt or rod is arranged centrally of the knife or cutter, there is no liability of the latter to roll or rotate, when it is raised or lowered by the adjusting lever. The guide 24 consists of a rectangular plate secured by screws, or other suitable fastening devices, to the outer face of one of the sides 2 of the frame or support, and it is provided at its upper face with a recess 25 to receive the adjacent side of the adjusting lever. A washer 26 is preferably arranged within the guide, and interposed between the adjacent side of the lever and the contiguous side 2 of the frame or support. The device, although described as a vegetable and fruit slicer and cutter, may be advantageously employed for cutting dried meats and other material, and is also adapted for cutting corn from the cob.

Having thus fully described my invention, what I claim as new and desire to secure by Letters Patent, is:—

1. A slicer and cutter comprising a frame or support having spaced sides, a knife located between the sides of the frame or support and extending longitudinally thereof and provided at opposite ends with blades extending transversely of the slicer and cutter, said knife being pivotally mounted and arranged to be rotated between the spaced sides of the frame or support without removing it therefrom, and means for causing the spaced sides to clamp the knife for holding either blade in position for use.

2. A slicer and cutter comprising a frame or support having spaced sides provided with longitudinal ways and provided with slots or openings arranged at an angle to the ways, a knife having blades at opposite ends extending transversely of the slicer and cutter, said knife being provided with a pivot mounted in the said openings thereby permitting the knife to be rotated without removing it from the frame, and also enabling the knife to be adjusted toward and from the ways to vary the thickness of the slice, and a reciprocatable slide for carrying the material.

3. A slicer and cutter provided with a reciprocating slide for carrying the material, and having a pivotally mounted knife provided with a plurality of blades of different forms and arranged to be rotated, without removing it from the slicer and cutter, to bring any one of the blades opposite the slide in position for use, and operating means connected with the ends of the pivot of the knife for adjusting the latter to vary the thickness of the slices.

4. A slicer and cutter comprising a frame or support, a reversible knife having a plurality of blades pivotally mounted within the frame or support and arranged to be rotated, without removing it from the said frame or support, and operating means connected with the ends of the pivot of the knife for adjusting the latter to vary the thickness of the slice, and a guide receiving the pivot and holding the same against rotary movement.

5. A slicer and cutter comprising a frame or support, a reversible knife having a pivot, and an adjusting lever connected with the pivot for moving the same to adjust the knife to vary the thickness of the slice.

6. A slicer and cutter comprising a frame or support, a reversible knife having a pivot, an adjusting lever connected with the pivot for moving the same to adjust the knife to vary the thickness of the slice, and means mounted on the pivot for clamping the knife in its adjustment.

7. A slicer and cutter comprising a frame or support having spaced sides, a reversible knife, a pivot for the knife, said pivot being movably mounted on the frame to adjust the knife to vary the thickness of the slice, and a lever composed of opposite sides and a connecting portion, the sides of the lever being mounted on the sides of the frame or support and connected with the pivot for moving the same.

8. A slicer and cutter comprising a frame or support, a reversible knife having a pivot mounted on the frame or support and provided with a head, a guide having a slot to receive the head of the pivot and provided at its inner face with a recess, and a lever fulcrumed on the frame or support and operating in the recess and connected with the pivot.

In testimony, that I claim the foregoing as my own, I have hereto affixed my signature in the presence of two witnesses.

JOSEPH A. CHILDRESS.

Witnesses:
  H. C. MILLER,
  W. G. HALL.